United States Patent
Kitadai

(10) Patent No.: US 11,437,171 B2
(45) Date of Patent: Sep. 6, 2022

(54) MAGNETIC MATERIAL, ELECTRONIC COMPONENT, AND WINDING CORE

(71) Applicant: Murata Manufacturing Co., Ltd., Kyoto-fu (JP)

(72) Inventor: Yuuki Kitadai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 419 days.

(21) Appl. No.: 16/697,083

(22) Filed: Nov. 26, 2019

(65) Prior Publication Data
US 2020/0176157 A1    Jun. 4, 2020

(30) Foreign Application Priority Data
Nov. 29, 2018   (JP) .............................. JP2018-223568

(51) Int. Cl.
| | | |
|---|---|---|
| H01F 1/36 | (2006.01) | |
| H01F 27/255 | (2006.01) | |
| H01F 27/28 | (2006.01) | |
| C04B 35/26 | (2006.01) | |

(52) U.S. Cl.
CPC .............. *H01F 1/36* (2013.01); *C04B 35/265* (2013.01); *H01F 27/255* (2013.01); *H01F 27/2823* (2013.01); *C04B 2235/3274* (2013.01); *C04B 2235/3281* (2013.01); *C04B 2235/3298* (2013.01); *C04B 2235/3418* (2013.01); *C04B 2235/5445* (2013.01); *C04B 2235/5481* (2013.01)

(58) Field of Classification Search
CPC ...... H01F 1/36; H01F 27/255; H01F 27/2823; C04B 35/265; C04B 2235/3274; C04B 2235/3281; C04B 2235/3298; C04B 2235/3418; C04B 2235/5445; C04B 2235/5481

See application file for complete search history.

(56) References Cited

U.S. PATENT DOCUMENTS 6,736,990 B2 *   5/2004   Aoki ....................... H01F 1/344
                                                 252/62.62

FOREIGN PATENT DOCUMENTS

| JP | H01-228108 A | 9/1989 |
| JP | H07-25618 A | 1/1995 |
| JP | 2004-172396 A | 6/2004 |

OTHER PUBLICATIONS

An Office Action; "Notice of Reasons for Refusal," by the Japanese Patent Office dated Apr. 20, 2021, which corresponds to Japanese Patent Application No. 2018-223568 and is related to U.S. Appl. No. 16/697,083 with English language translation.

* cited by examiner

*Primary Examiner* — C Melissa Koslow
(74) *Attorney, Agent, or Firm* — Studebaker & Brackett PC

(57) ABSTRACT

A magnetic material which is likely to be cracked or chipped. The magnetic material is a magnetic material including ferrite particles and segregated particles containing Bi and Si, and characteristically, the magnetic material contains, as a main constituent, 46.0 mol % to 50.0 mol % $Fe_2O_3$, 0.4 mol % to 8.0 mol % CuO, 23.0 mol % to 32.0 mol % ZnO, and 18.0 mol % to 22.0 mol % NiO, and the ratio of the average particle size of the segregated particles to the average particle size of the ferrite particles is 0.04 or more and 0.19 or less (i.e., 0.04 to 0.19).

20 Claims, 7 Drawing Sheets

MAGNETIC MATERIAL, ELECTRONIC COMPONENT, AND WINDING CORE

CROSS-REFERENCE TO RELATED APPLICATION

This application claims benefit of priority to Japanese Patent Application No. 2018-223568, filed Nov. 29, 2018, the entire content of which is incorporated herein by reference.

BACKGROUND

Technical Field

The present disclosure relates to a magnetic material, an electronic component, and a winding core.

Background Art

As mobile devices such as smartphones become more sophisticated, wound inductors are required to be further reduced in size. Since the product strength is decrease with reduction in inductor size, the winding core is required to be kept from being cracked and chipped.

For example, Japanese Patent Application Laid-Open No. 01-228108 discloses a Ni—Cu—Zn-based oxide magnetic material in which defective polishing such as polishing chips is reduced by interposing a stress relaxation layer made of $SiO_2$, MnO, $Bi_2O_3$ between ferrite particles.

SUMMARY

With further reduced in inductor size, however, the magnetic material described in Japanese Patent Application Laid-Open No. 01-228108 may be incapable of sufficiently suppressing cracks and chips (hereinafter, collectively referred to as cracks/chips).

Accordingly, the present disclosure provides a magnetic material which is less likely to be cracked or chipped.

A magnetic material according to the present disclosure is a magnetic material including ferrite particles and segregated particles containing Bi and Si, and characteristically, the magnetic material contains, as a main constituent, 46.0 mol % to 50.0 mol % $Fe_2O_3$, 0.4 mol % to 8.0 mol % CuO, 23.0 mol % to 32.0 mol % ZnO, and 18.0 mol % to 22.0 mol % NiO, and the ratio of the average particle size of the segregated particles to the average particle size of the ferrite particles is 0.04 or more and 0.19 or less (i.e., from 0.04 to 0.19). An electronic component according to the present disclosure characteristically includes the magnetic material according to the present disclosure. A winding core according to the present disclosure characteristically includes the magnetic material according to the present disclosure.

According to the present disclosure, a magnetic material can be provided which is less likely to be cracked or chipped.

DETAILED DESCRIPTION

Figure 1:
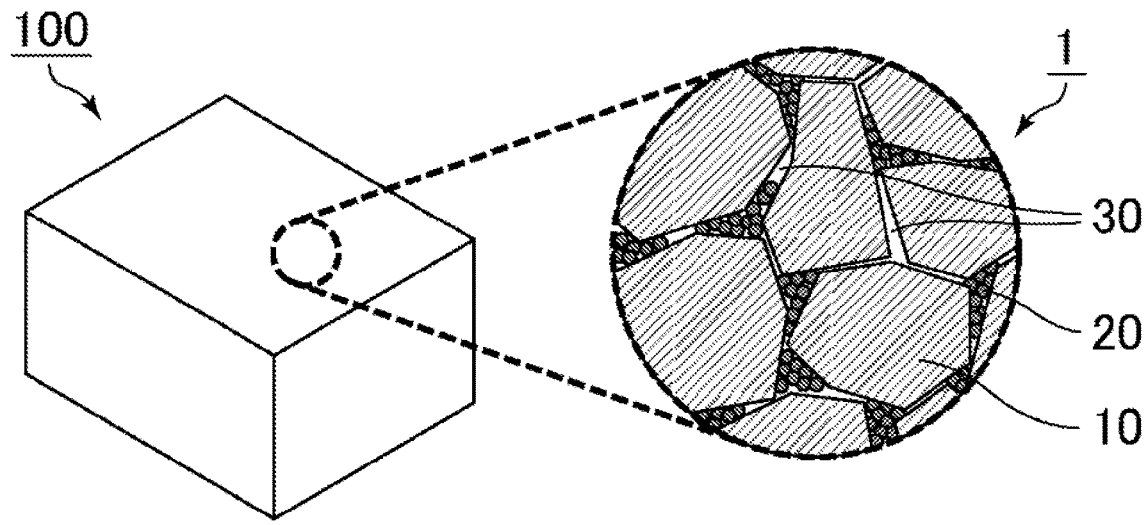
FIG. 1 is a perspective view schematically illustrating an example of a magnetic material and a winding core according to the present disclosure.

A magnetic material according to the present disclosure will be described below.

However, the present disclosure is not to be considered limited to the following embodiments, but can be applied with changes appropriately made without changing the scope of the present disclosure. It is to be noted that the present disclosure also encompasses combinations of two or more individual desirable configurations as described below.

The magnetic material according to the present disclosure is composed of $Fe_2O_3$, CuO, ZnO, and NiO as a main constituent, and other constituents (also referred to as accessory constituents).

The magnetic material according to the present disclosure contains, as the main constituent, 46.0 mol % to 50.0 mol % $Fe_2O_3$, 0.4 mol % to 8.0 mol % CuO, 23.0 mol % to 32.0 mol % ZnO, and 18.0 mol % to 22.0 mol % NiO.

The contents of $Fe_2O_3$, CuO, ZnO, and NiO in the magnetic material can be measured by inductively-coupled plasma (ICP) emission spectroscopy. In the mol % determination of $Fe_2O_3$, CuO, ZnO, and NiO in the main constituent, the accessory constituents are not considered.

The magnetic material according to the present disclosure includes ferrite particles and segregated particles.

The ferrite particles contain Fe, Cu, Zn, and Ni. In addition, the segregated particles contain Bi and Si.

In the magnetic material according to the present disclosure, the ratio of the average particle size of the segregated particles to the average particle size of the ferrite particles is 0.04 or more and 0.19 or less (i.e., from 0.04 to 0.19), and preferably 0.04 or more and 0.10 or less (i.e., from 0.04 to 0.10).

When the ratio is 0.04 or more and 0.19 or less (i.e., from 0.04 to 0.19), the segregated particles can suppress the development of cracks generated in the ferrite particles.

On the other hand, in a case where the ratio is less than 0.04, the average particle size of the segregated particles is excessively small with respect to the average particle size of the ferrite particles, and the crack suppression effect of the segregated particles is thus not sufficiently exerted. Alternatively, in a case where the ratio is more than 0.19, the segregated particles serve as starting points for cracks and cracks, and the crack suppression effect of the segregated particles is not exerted.

The average particle size of the ferrite particles and the average particle size of the segregated particles can be determined from a region of 40 μm×30 μm randomly selected in an enlarged image at 3000-fold magnification, obtained by observing the magnetic material with a scanning electron microscope (hereinafter also referred to as an SEM).

Specifically, in the observation of the magnetic material with an SEM, the ferrite particles are displayed in gray, whereas the segregated particles are displayed in white, and the ferrite particles and the segregated particles can be thus distinguished in the SEM image. In addition, in the case of the ferrite particles in contact with each other, the boundary can be confirmed in the SEM image, thus, the area of each ferrite particle distinguished by the boundary is determined, and the equivalent circle diameter (also referred to as Heywood diameter) of the projected area is determined from the area. On the other hand, in the case of the segregated particles in contact with each other, no boundary can be confirmed from the SEM image, thus, an inseparable area displayed in white in the SEM image is regarded as one segregated particle, and the equivalent circle diameter of the projected area is determined from the area.

For all of the ferrite particles and segregated particles in the above-mentioned region (40 μm×30 μm), the particle sizes are determined by the same method, and the respective average values are regarded as the average particle size of the ferrite particles and the average particle size of the segregated particles. In consideration of the influence of noise and the like, however, segregated particles of 0.08 μm or less in the equivalent circle diameter of the projected area are excluded from the calculation of the average particle size.

For the distinguishing between ferrite particles and segregated particles present in the designated region of the SEM image, measuring the areas, calculating the equivalent circle diameters of the projected areas corresponding to the areas, and calculating the average values, commercially available image processing software (for example, Azo-kun (registered trademark) from Asahi Kasei Engineering Corporation) can be used.

The ferrite particles constituting the magnetic material according to the present disclosure will be described.

The composition of the ferrite particles, which is not particularly limited, preferably contains 46.0 mol % to 50.0 mol % $Fe_2O_3$, 0.4 mol % to 8.0 mol % CuO, 23.0 mol % to 32.0 mol % ZnO, and 18.0 mol % to 22.0 mol % NiO, and more preferably contains no Bi or Si.

The composition of the ferrite particles further preferably contains 47.5 mol % to 49.0 mol % $Fe_2O_3$, 0.4 mol % to 6.0 mol % CuO, 23.1 mol % to 31.9 mol % ZnO, and 18.0 mol % to 21.9 mol % NiO.

In the magnetic material according to the present disclosure, the average particle size of the ferrite particles is preferably 2.00 μm or more and 10.00 μm or less (i.e., from 2.00 μm to 10.00 μm), and more preferably 2.00 μm or more and 8.00 μm or less (i.e., from 2.00 μm to 8.00 μm).

The magnetic material according to the present disclosure may further contain Ca, Mg, Mo, Nb, Sn, and Co.

The content of Ca in the magnetic material is preferably 100 ppm or less in terms of CaO with respect to the main constituent.

The content of Mg in the magnetic material is preferably 200 ppm or less in terms of MgO with respect to the main constituent.

The content of Mo in the magnetic material is preferably 30 ppm or less in terms of $MoO_3$ with respect to the main constituent.

The content of Nb in the magnetic material is preferably 10 ppm or less in terms of $Nb_2O_5$ with respect to the main constituent.

The content of Sn in the magnetic material is preferably more than 0% by weight and 0.58% by weight or less (i.e., from 0% by weight to 0.58% by weight) in terms of $SnO_2$ with respect to the main constituent.

The content Co in the magnetic material is preferably 0.02% by weight or more and 0.15% by weight or less (i.e., from 0.02% by weight to 0.15% by weight) in terms of $Co_3O_4$ with respect to the main constituent.

The segregated particles constituting the magnetic material according to the present disclosure will be described.

The segregated particles contain Bi and Si.

Whether the segregated particles contain Bi and Si or not can be confirmed by observing the surface of the magnetic material according to the present disclosure with the use of SEM-EDX and confirming whether characteristic X-rays derived from Bi and Si are detected from the surfaces of the segregated particles or not. Whether the segregated particles contain other elements can also be confirmed by the same method.

The average particle size of the segregated particles constituting the magnetic material according to the present disclosure is not particularly limited, but is preferably 0.35 μm or more and 0.60 μm or less (i.e., from 0.35 μm to 0.60 μm), and more preferably 0.35 μm or more and 0.50 μm or less (i.e., from 0.35 μm to 0.50 μm).

The Bi content in the magnetic material is not particularly limited, but is preferably 0.30% by weight or more and 4.00% by weight or less (i.e., from 0.30% by weight to 4.00% by weight), more preferably 0.75% by weight or more and 4.00% by weight or less (i.e., from 0.75% by weight to 4.00% by weight) in terms of $Bi_2O_3$ with respect to the main constituent.

The Si content in the magnetic material is not particularly limited, but is preferably 0.10% by weight or more and 1.00% by weight or less (i.e., from 0.10% by weight to 1.00% by weight), more preferably 0.25% by weight or more and 1.00% by weight or less (i.e., from 0.25% by weight to 1.00% by weight) in terms of $SiO_2$ with respect to the main constituent.

The ratio (Bi/Si) by weight of Bi in the magnetic material to Si in the magnetic material is not particularly limited, but is preferably 3.00 or more and 5.00 or less (i.e., from 3.00 to 5.00) in terms of $Bi_2O_3$ and $SiO_2$, respectively.

The segregated particles may contain, besides Bi and Si, an element selected from the group consisting of Cu, Sn, Co, Zn, and Ni.

When the segregated particles contain Cu, the firing temperature required for producing the magnetic material can be decreased.

When the segregated particles contain Sn, favorable direct current superposition characteristics can be achieved, even in a case where a semi-closed magnetic circuit structure from which the magnetic flux is less likely to leak to the outside (for example, a structure with a top board of a magnetic body disposed on or a magnetic powder-containing resin applied to the surface of the inductor) is employed as the structure of the wound inductor.

When the segregated particles contain Co, the high frequency characteristics can be improved.

The segregated particles preferably further contain Cu.

The Cu content in the segregated particles is not particularly limited, but is preferably 0% by weight or more and 1.0% by weight or less (i.e., from 0% by weight to 1.0% by weight), and more preferably more than 0% by weight and 1.0% by weight or less (i.e., from 0% by weight to 1.0% by weight) in terms of CuO with respect to the main constituent.

The segregated particles preferably further contain Sn.

The Sn content in the segregated particles is not particularly limited, but is preferably more than 0% by weight and 0.58% by weight or less (i.e., from 0% by weight to 0.58% by weight) in terms of $SnO_2$ with respect to the main constituent.

The segregated particles preferably further contain Co.

The Co content in the segregated particles is not particularly limited, but is preferably 0.02% by weight or more and 0.15% by weight or less (i.e., from 0.02% by weight to 0.15% by weight) in terms of $Co_3O_4$ with respect to the main constituent.

It is to be noted that in a case where the segregated particles contain Cu, the Cu contained in the ferrite particles and the Cu contained in the segregated particles can be distinguished by elemental mapping such as SEM-EDS.

In the magnetic material according to the present disclosure, the proportion of the volume occupied by the segregated particles to the volume excluding voids (hereinafter also referred to as a segregation ratio) is preferably 0.3% or more and 4.0% or less (i.e., from 0.3% to 4.0%).

The segregation ratio is determined from the area of the segregated particles with respect to the area excluding voids in the SEM image used for measuring the average particle sizes of the ferrite particles and segregated particles described above.

A winding core according to the present disclosure characteristically includes the magnetic material according to the present disclosure.

Since the magnetic material according to the present disclosure is less likely to be cracked or chipped, the winding core according to the present disclosure is high in mechanical strength. Thus, in the case of preparing a wound inductor by winding a winding wire around a winding core, defects such as cracks and chips (also referred to as chipping) are less likely to be generated.

The winding core according to the present disclosure will be described with reference to FIG. 1.

FIG. 1 is a perspective view schematically illustrating an example of a magnetic material and a winding core according to the present disclosure.

As shown in FIG. 1, a winding core 100 is made of a magnetic material 1. The magnetic material 1 is composed of ferrite particles 10 and segregated particles 20. In addition, voids 30 may be formed between the ferrite particles 10, between the segregated particles 20, and between the ferrite particles 10 and the segregated particles 20.

The shape of the winding core according to the present disclosure is not particularly limited, and an E type, a donut type, and the like can also be adopted. In addition, since the winding core according to the present disclosure is less likely to be cracked or chipped, shapes (for example, an H type) which are likely to be cracked or chipped can also be employed.

The H type refers to a shape of H in a top view, composed of a winding core part that is relatively small in the cross-sectional area perpendicular to the longitudinal direction, and flange parts that are located at both ends of the winding core part and relatively large in the cross-sectional area perpendicular to the longitudinal direction.

An example of an H-type winding core will be described with reference to FIG. 2.

Figure 2:
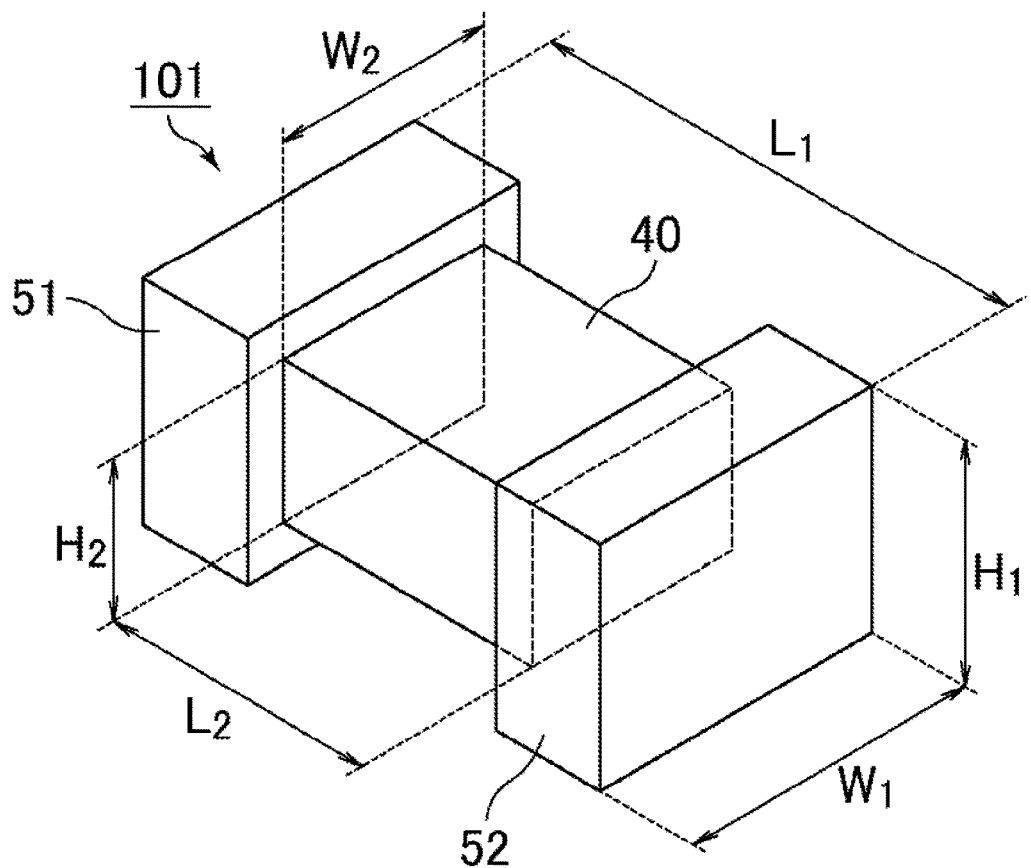
FIG. 2 is a perspective view schematically illustrating another example of the winding core according to the present disclosure.

FIG. 2 is a perspective view schematically illustrating another example of the winding core according to the present disclosure.

The winding core 101 shown in FIG. 2 includes a winding core part 40 and flange parts 51 and 52 located at both ends of the winding core part 40.

Winding a winding wire around the winding core part 40 allows a wound inductor to be provided.

The external dimensions (hereinafter, also referred to simply as dimensions) of the winding core 101 are a length $L_1$, a height $H_1$, and a width $W_1$, and the dimensions of the winding core part 40 are a length $L_2$, a height $H_2$, and a width $W_2$, and the dimensions meet $L_1 > L_2$, $H_1 > H_2$, and $W_1 > W_2$.

The cross-sectional shape of the winding core part 40 perpendicular to the longitudinal direction can be adjusted in accordance with the characteristics of the wound inductor to be obtained.

In a case where the winding core is H-type in shape, the shape of the winding core part is not particularly limited, and may be cuboid as with the winding core 101 shown in FIG. 2, or cylindrical unlike the winding core 101 shown in FIG. 2.

In addition, the size of the winding core part is not particularly limited, and can be appropriately adjusted depending on the desired size of the external electrode and the turn number of the winding (also referred to as the number of turns).

The length of the winding core part is preferably 50% or more and 60% or less (i.e., from 50% to 60%) of the length of the winding core.

The height of the winding core part is preferably 60% or more and 70% or less (i.e., from 60% to 70%) of the height of the winding core.

The width of the winding core part is preferably 60% or more and 70% or less (i.e., from 60% to 70%) of the width of the winding core.

An electronic component according to the present disclosure characteristically includes the magnetic material according to the present disclosure.

Examples of the electronic component include a winding core, and a wound inductor with a winding wire wound around the winding core. In addition, a multilayer inductor obtained by laminating and firing a coil sheet with a coil pattern molded on the surface of the sheet-shaped magnetic material according to the present disclosure is also an electronic component according to the present disclosure.

A wound inductor with a winding wire wound around a winding core made of the magnetic material according to the present disclosure will be described as an example of the electronic component according to the present disclosure.

A wound inductor can be prepared by winding a winding wire around a winding core made of the magnetic material according to the present disclosure.

The wound inductor includes the winding core according to the present disclosure, and a winding with a winding wire wound around the winding core.

The winding core constituting the wound inductor is excellent in mechanical strength, and thus less likely to be damaged by impact or the like.

In a case where the winding core constituting the wound inductor is H-type in shape, with a winding wire wound around the winding core part, and both ends of the winding are preferably connected respectively to external electrodes provided on the flange parts.

Figure 3:
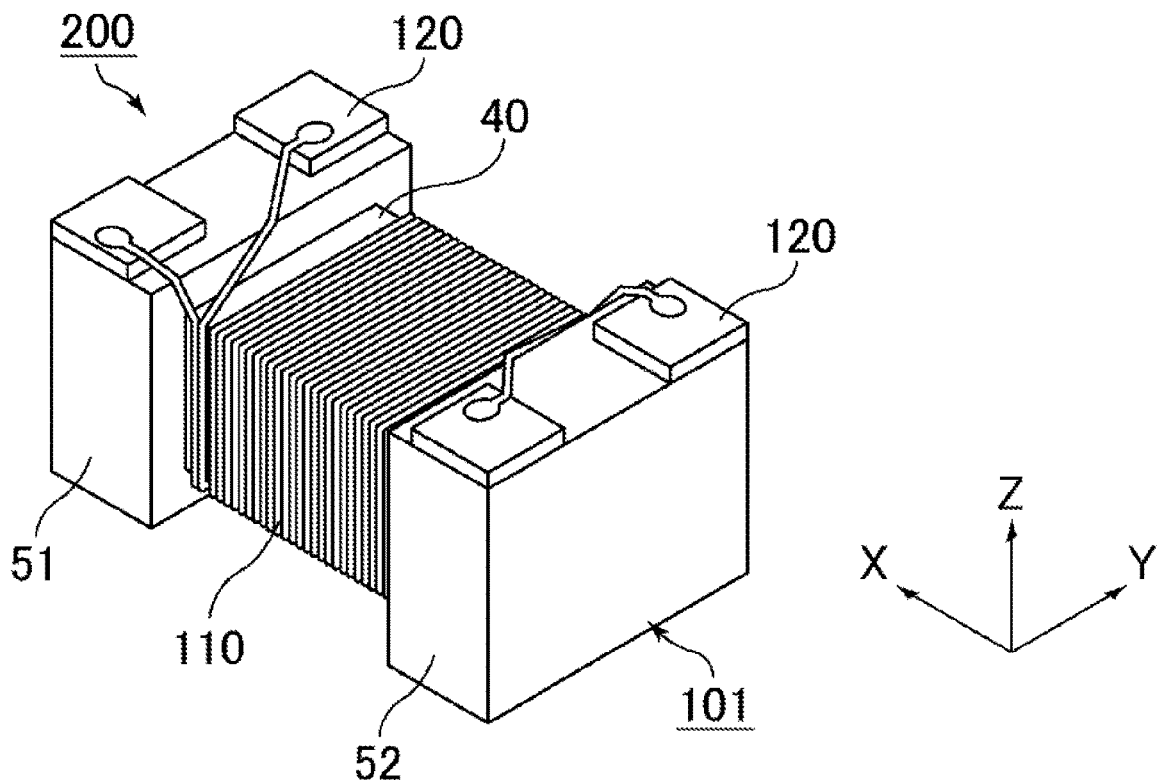
FIG. 3 is a perspective view schematically illustrating an example of an electronic component according to the present disclosure.

FIG. 3 is a perspective view schematically illustrating an example of the electronic component according to the present disclosure.

For the wound inductor 200 shown in FIG. 3, winding wires 110 are wound around the winding core part 40 of the winding core 101, and one end of the winding wire 110 and the other thereof are connected respectively to external electrodes 120 provided on the flange parts 51 and 52. The surface with the external electrode 120 provided thereon serves as a mounting surface.

It is to be noted that for the wound inductor 200 shown in FIG. 3, two winding wires 110 are wound around the winding core 101, but the number of winding wires is not limited to two, and may be one, or may be three or more.

For the wound inductor, the surface of the winding may be partially or entirely covered with the magnetic material.

Examples of the wound inductor with the surface partially covered with the magnetic material include an inductor where a magnetic layer coated with a magnetic powder-containing resin or a top board of a magnetic body (hereinafter, referred to as a magnetic plate) is disposed on the surface opposite to the mounting surface of the wound inductor. The magnetic layer formed by applying the magnetic powder-containing resin or the magnetic plate blocks the leakage of some or all of the magnetic field generated by the winding to the outside, and the magnetic layer or the magnetic plate is also referred to as a semi-closed magnetic circuit structure or a closed magnetic circuit structure.

Such a structure is less likely to cause interference with wiring and other electronic components around the wound inductor.

Examples of a wound inductor that has a semi-closed magnetic circuit structure will be described with reference to FIGS. 4 to 7.

Figure 4:
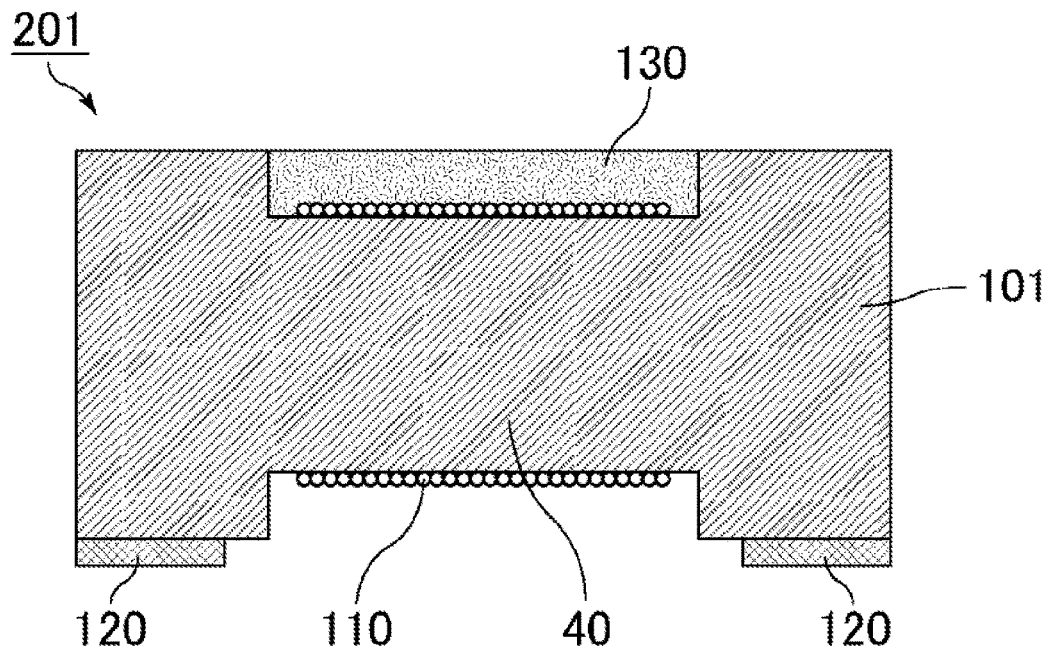
FIG. 4 is a diagram schematically illustrating another example of the electronic component according to the present disclosure.
Figure 5:
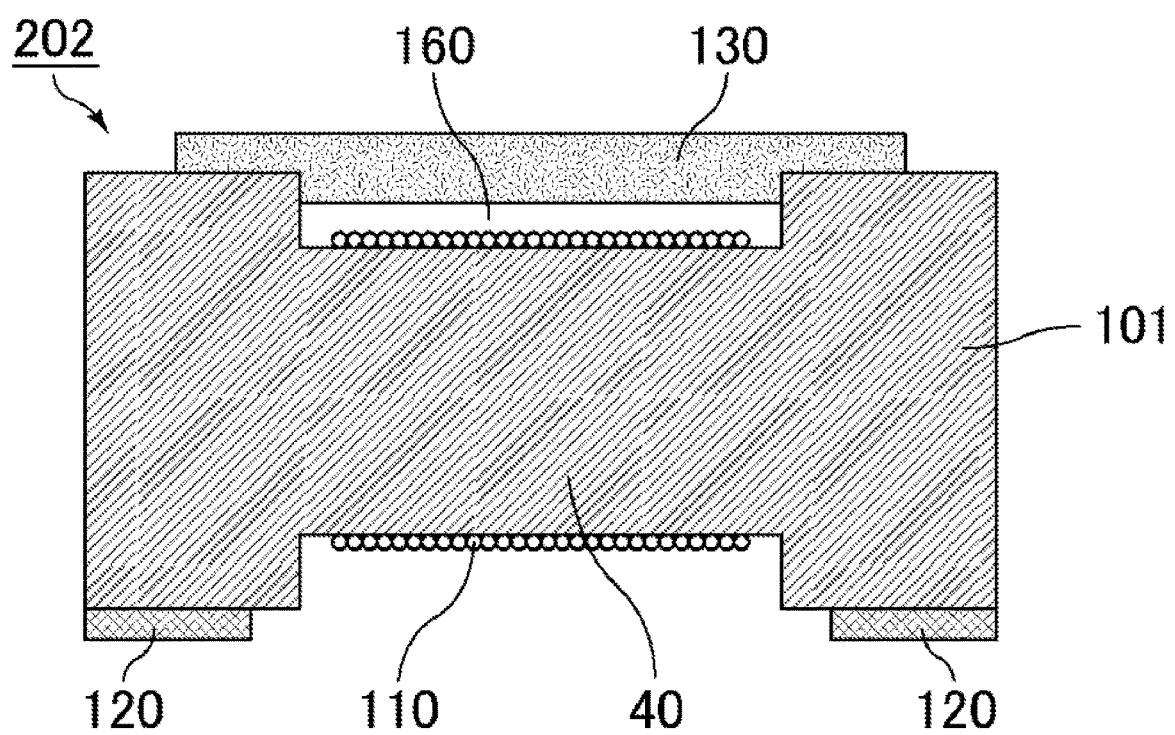
FIG. 5 is a diagram schematically illustrating still another example of the electronic component according to the present disclosure.

FIG. 4 is a diagram schematically illustrating another example of the electronic component according to the present disclosure, and FIG. 5 is a diagram schematically illustrating still another example of the electronic component according to the present disclosure.

For the wound inductor 201 shown in FIG. 4, the surface opposite to the mounting surface (the surface with the external electrodes 120 provided), of the surface of the winding wire 110 provided on the winding core part 40, is covered with a magnetic layer 130 made of a magnetic powder-containing resin.

In addition, for the wound inductor 202 shown in FIG. 5, the surface opposite to the mounting surface (the surface with the external electrodes 120 provided), of the surface of the winding core part 40, is covered with a magnetic layer 130 made of a magnetic powder-containing resin. Between the winding wire 110 and the magnetic layer 130, a gap 160 is provided, with the winding wire 110 and the magnetic layer 130 out of contact with each other.

Figure 6:
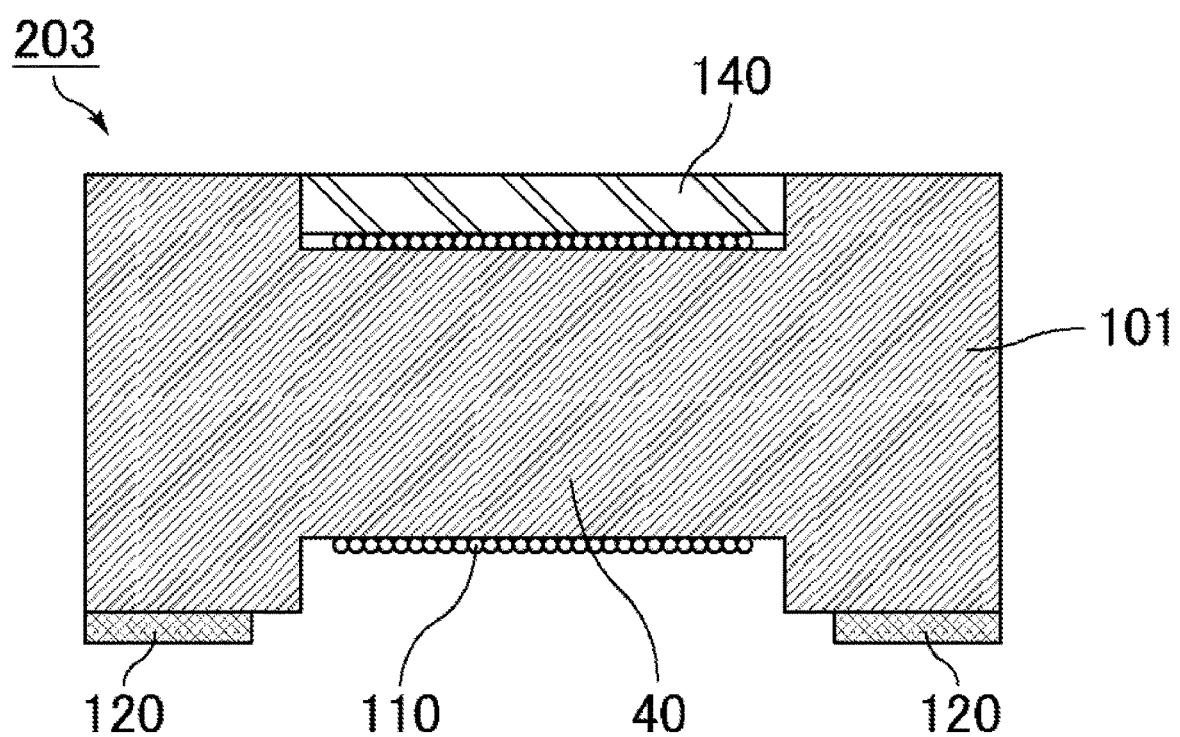
FIG. 6 is a diagram schematically illustrating still another example of the electronic component according to the present disclosure.
Figure 7:
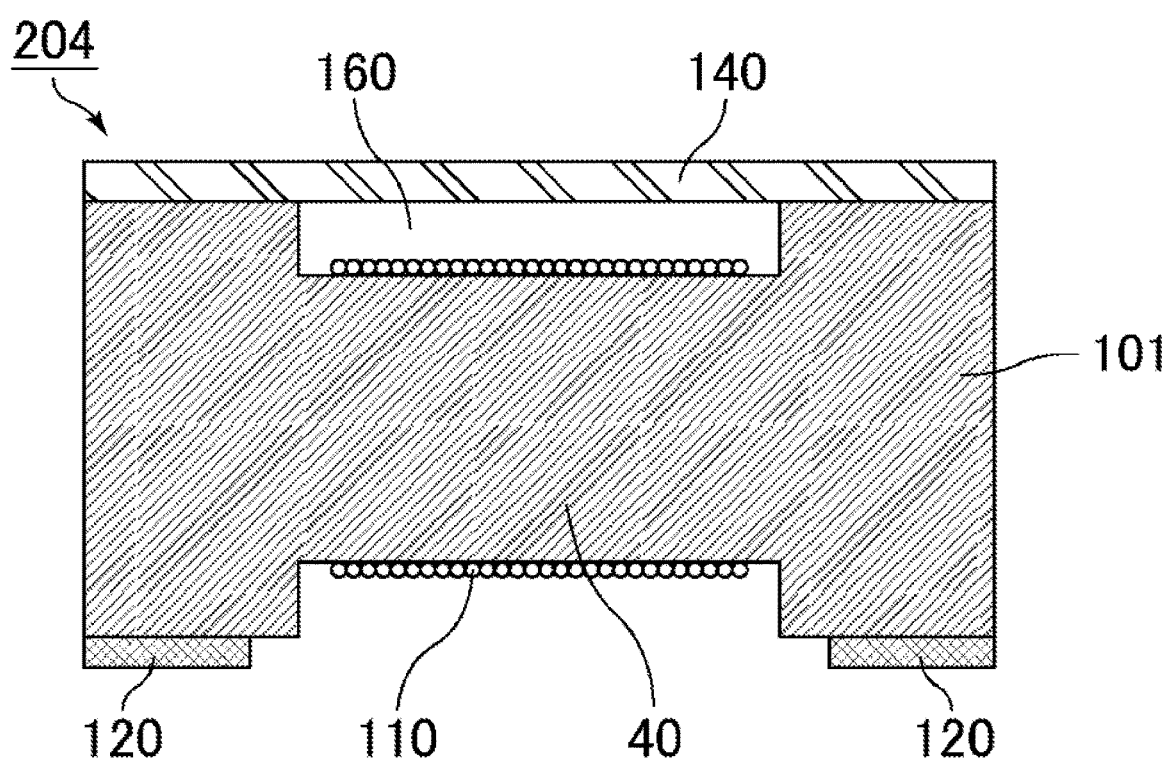
FIG. 7 is a diagram schematically illustrating still another example of the electronic component a to the present disclosure.

FIG. 6 is a diagram schematically illustrating still another example of the electronic component according to the present disclosure, and FIG. 7 is a diagram schematically illustrating still another example of the electronic component according to the present disclosure.

For the wound inductor 203 shown in FIG. 6, the surface opposite to the mounting surface (the surface with the external electrodes 120 provided), of the surface of the winding wire 110 provided on the winding core part 40, is covered with a magnetic plate 140.

In addition, for the wound inductor 204 shown in FIG. 7, the surface opposite to the mounting surface (the surface with the external electrodes 120 provided), of the surface of the winding core 101, is covered with a magnetic plate 140.

Between the surface opposite to the mounting surface, of the surface of the winding wire 110 provided on the winding part 40, and the magnetic plate 140, a gap 160 is provided, with the winding wire 110 and the magnetic plate 140 out of contact with each other.

It is to be noted that for the wound inductor 204 shown in FIG. 7, the surface opposite to the mounting surface, of the surface of the winding core 101, is covered with the magnetic plate 140, but for the wound inductor with the winding core according to the present disclosure, the surface opposite to the mounting surface, of the surface of the winding core 101, may be covered with the magnetic plate 140.

The winding wire (also referred to as a magnet wire) constituting the wound inductor refers to a metallic wire that has a surface covered with an insulating film, and the thickness (wire diameter), turn number (number of turns), cross-sectional shape, and number of winding wires are not particularly limited, and can be changed appropriately depending on the desired characteristics and mounting location. In addition, the positions and number of external electrodes can also be set appropriately depending on the number of winding wires and the use application.

Examples of the magnetic body constituting the magnetic layer and the magnetic plate include ceramics such as ferrite particles constituting the magnetic material according to the present disclosure. The magnetic layer and the magnetic plate may contain an organic substance, a metal, or the like as a constituent other than the ferrite particles.

In addition, the magnetic layer and the magnetic plate may contain nonmagnetic ceramics. In addition, examples of the resin constituting the magnetic layer include a polyimide resin and an epoxy resin.

A method for producing the magnetic material according to the present disclosure will be described.

For the magnetic material according to the present disclosure, for example, main constituent particles for ferrite particles are mixed with accessory constituent particles for segregated particles, a binder is further added to the mixture to prepare a slurry, the slurry is granulated with a spray dryer to prepare secondary particles (also referred to as granulated particles), and the secondary particles are subjected to firing at 900 to 1100° C., thereby making it possible to obtain a magnetic material. This magnetic material is molded into a predetermined shape, thereby making it possible to obtain a winding core made of the magnetic material.

The method for obtaining the winding core may be a method of molding the secondary particles into a predetermined shape and firing the molded article, or a method of molding the powdery magnetic material obtained by firing the secondary particles into a predetermined shape.

Moreover, a wound inductor which is an example of the electronic component according to the disclosure can be obtained by winding a winding wire around the obtained winding core.

The preparation of the main constituent particles for ferrite particles and the mixing of the main constituent particles and the accessory constituent particles can be carried out by a known grinding-mixing device (for example, an attritor, a bead mill, etc.), and preferably carried out in a wet manner.

Examples of the solvent in the wet mixing include water and organic solvents such as ethanol.

The average particle size of the ferrite particles and the average particle size of the segregated particles in the magnetic material can be adjusted appropriately changing the time of mixing the main constituent particles and the accessory constituent particles, the mixing order of the accessory constituent particles and the binder, and the spray dryer conditions.

Examples of the method for adjusting the ratio of the average particle size of the segregated particles to the average particle size of the ferrite particles to 0.04 or more and 0.19 or less (i.e., from 0.04 to 0.19) include methods such as: 1) adjusting the time of mixing the main constituent particles and accessory constituent particles to 15 minutes or longer and 60 minutes or shorter (i.e., from 15 minutes to 60 minutes), preferably 15 minutes or longer and 30 minutes or shorter (i.e., from 15 minutes to 30 minutes); 2) first thoroughly mixing the main constituent particles and the binder, and then adding and mixing the accessory constituent particles; 3) adjusting the particle sizes of the main constituent particles and accessory constituent particles; and 4) adjusting the firing temperature.

By a method of winding a winding wire around the winding core, and then applying a magnetic powder-containing resin to a part of the winding wire and drying or curing the resin, or by attaching a magnetic plate, the wound inductor is configured to have a semi-closed magnetic circuit structure.

EXAMPLES

Hereinafter, examples of more specifically disclosing the magnetic material, the electronic component, and the winding core according to the present disclosure more specifically will be provided. It is be noted that the present disclosure is not to be considered limited to only these examples.

[Preparation of Sample]

Example 1

(Preparation of Main Constituent Particles)

A mixture with a composition of $Fe_2O_3$: 48.8 mol %, CuO: 0.4 mol %, ZnO: 31.9 mol %, and NiO: 18.9 mol % was mixed with water, and subjected to wet mixing with an attritor containing zirconia balls therein. The mixed slurry was dried and subjected to granulation, and then subjected to firing at 850° C. for 2 hours to prepare main constituent particles.

(Preparation of Slurry)

With respect to 100 parts by weight of the main constituent particles, accessory constituent particles composed of 1.00 part by weight of $SiO_2$, 0.15 parts by weight of $Co_3O_4$, and 4.00 parts by weight of $Bi_2O_3$ were mixed, then while mixing the mixture in a wet manner with an attritor containing zirconia balls therein, 2.5 parts by weight (solid content weight) of polyvinyl alcohol as a binder, 0.6 parts by weight of a dispersant, 0.8 parts by weight of a plasticizer, and 0.1 parts by weight of an antifoaming agent were added thereto, and the mixture was further mixed for 30 minutes to prepare a slurry.

(Production of Granulated Particles)

The prepared slurry was granulated at 110 to 170° C. with a spray dryer to obtain granulated particles.

(Measurement of Specific Surface Area (SSA) of Granulated Particles)

After degreasing the obtained granulated particles, the specific surface area (SSA) thereof was measured by the following method with $N_2$ as an adsorption gas in a BET specific surface area measurement device.

The results are shown in Table 1.

(Preparation of Magnetic Material and Winding Core)

The obtained granulated particles are pressed into a predetermined shape with the use of a servo press machine, and subjected to firing at a maximum temperature of 1050° C. for 60 minutes, thereby providing a magnetic material according to Example 1 and a winding core made of the magnetic material (winding core according to Example 1). The shape of the winding core was an H type with external dimensions of 0.8 mm in length, 0.45 mm in width, and 0.45 mm in height, and the dimensions of the winding core part were 0.45 mm in length, 0.3 mm in width, and 0.3 mm in height.

(Measurement of Average Particle Sizes of Ferrite Particles and Segregated Particles)

Figure 8:
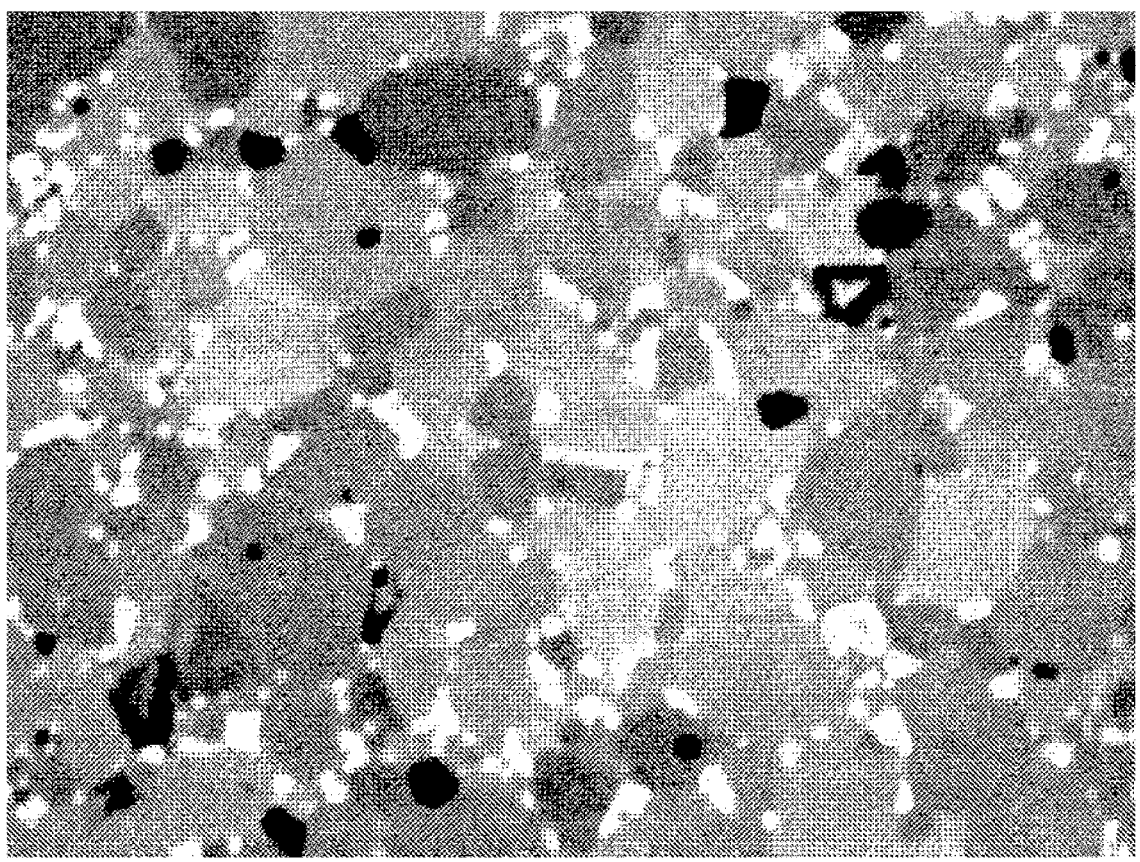
FIG. 8 is an SEM photograph (magnification: 3000 times) of a cross section of a winding core according to Example 1.
Figure 9:
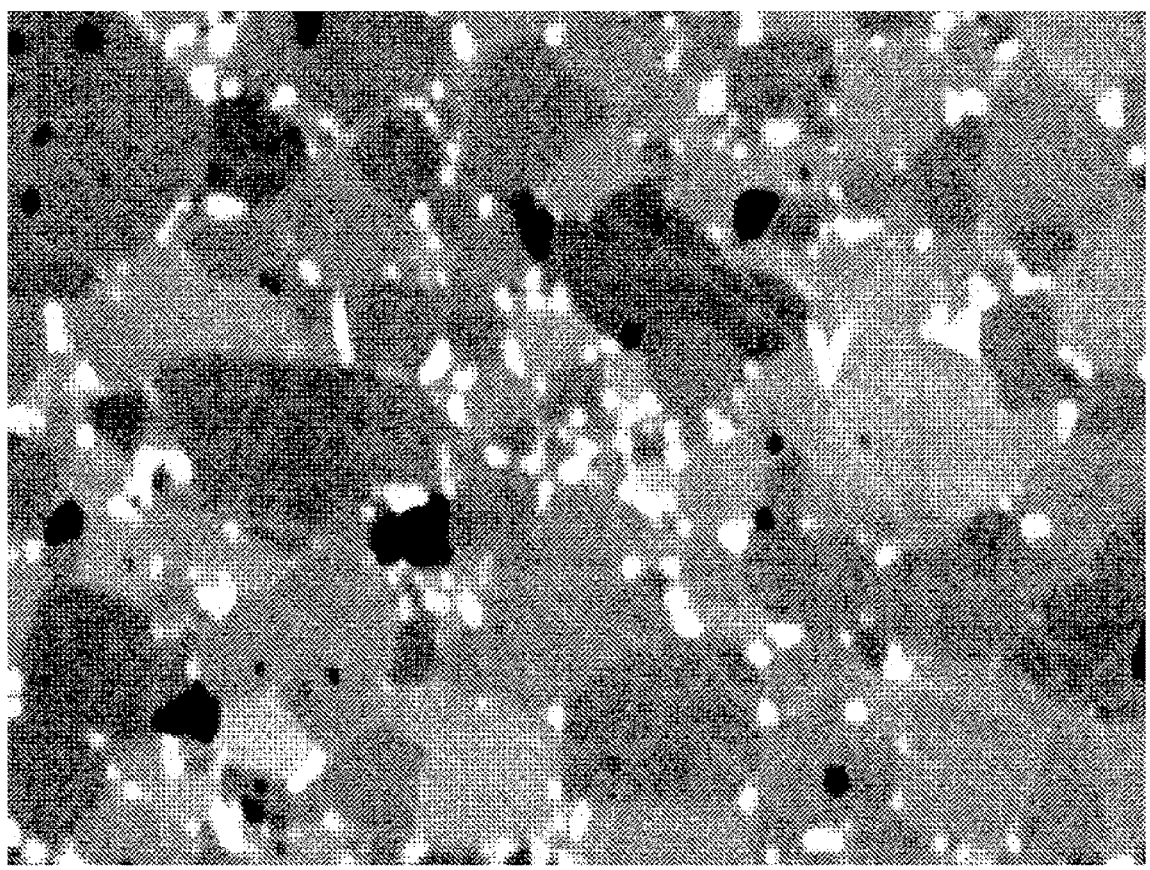
FIG. 9 is an SEM photograph (magnification: 3000 times) of a cross-section of a winding core according to Comparative Example 1.

The obtained winding core was cut in half in the length direction to expose the cut surface, and the cut surface was subjected to milling Subsequently, the vicinity of the center of the cut surface subjected to milling was observed at a magnification of 3000 times with the use of a scanning electron microscope. The average particle sizes for all of ferrite particles and segregated particles present in the region of 40 μm×30 μm randomly selected from the magnified image, and the ratio between the average particle sizes were measured with the use of commercially available image analysis software [Azo-kun (registered trademark), manufactured by Asahi Kasei Engineering Corporation]. Segregated particles of 0.08 μm or less in particle size were removed as noise, and not used for the calculation of the average particle size. The results are shown in Table 1 and FIGS. 8 and 9. FIG. 8 is an SEM photograph (magnification: 3000 times) of a cross section of the winding core according to Example 1, and FIG. 9 is an SEM photograph (magnification: 3000 times) of a cross section of a wiring core according to Comparative Example 1 as described later.

Moreover, for the region of the segregated particle distinguished by the SEM, the elements included in the segregated particles were confirmed with the use of SEM-EDX. In Example 1, Bi and Si were confirmed from the segregated particles.

(Measurement of Segregation Ratio)

From the SEM images used for measuring the average particle sizes of the ferrite particles and segregated particles, the segregation ratio was determined as the area of the segregated particles to the area excluding voids. The results are shown in Table 1.

(Measurement of Electrical Resistance Value IR)

External electrodes were formed on both ends (both end surfaces in the length direction) of the winding core, and the electrical resistance value IR of the winding core was measured with a resistance measurement instrument including a power supply and an electrometer. The results are shown in Table 1.

(Production of Wound Inductor)

A wound inductor according to Example 1 was obtained by disposing external electrodes on the surfaces of the flanges of the obtained H-shaped winding core, and winding a winding wire while fixing the winding core with a movable chuck, and then applying thermocompression bonding to the winding wire and the external electrodes. The number of turns of the winding wire was 19, and the diameter of the winding wire was 0.02 mm.

(Measurement of Chipping Ratio)

A thousand wound inductors were prepared by the method mentioned above. In this regard, the number of cracks and chips generated in the winding core was counted to determine the chipping ratio. The results are shown in Table 1.

Examples 2 to 6, Comparative Example 2

In accordance with the same procedures as in Example 1 except that the compositions of the main constituent particles and accessory constituent particles were changed so as to provide the compositions of the main constituent and other constituents as shown in Table 1, magnetic materials, winding cores, and wound inductors according Examples 2 to 6 to and Comparative Example 2 were prepared, and the SSA of the granulated particles, the average particle sizes of the ferrite particles and segregated particles, and the segregation ratio, the electrical resistance value, and the chipping ratio were measured. For Example 5, in addition to changing the compositions of the main constituent and other constituents as shown in Table 1, the mixing time in the slurry preparation was changed to 15 minutes.

Further, when the elements included in the segregated particles were confirmed with the use of SEM-EDX, it was confirmed that the segregated particles included Bi, Si, and Cu in Examples 2 to 6. In addition, it was confirmed that the segregated particles included no Bi or Si, but included Cu in Comparative Example 2.

Comparative Example 1

In accordance with the same procedures as in Example 1 except that the additive amounts of the binder, dispersant, and plasticizer added in the slurry preparation were changed respectively to 3.8 parts by weight, 1.2 parts by weight, and 1.6 parts by weight, and that the mixing time was changed to 90 minutes, a magnetic material, a winding core, and a wound inductor according Comparative Example 1 were prepared, and the SSA of the granulated particles, the average particle sizes of the ferrite particles and segregated particles, and the segregation ratio, the electrical resistance value, and the chipping ratio were measured. Further, when the elements included in the segregated particles were confirmed with the use of SEM-EDX, it was confirmed that the segregated particles included Bi and Si in Comparative Example 1.

From the results shown in Table 1, it has been determined that the winding cores made of the magnetic materials according to the present disclosure have sufficient characteristics as winding cores, and at the same time, have excellent mechanical strength. On the other hand, the winding cores according to Comparative Examples 1 and 2 caused problems, due to the high chipping ratios.

This is presumed to be, in Comparative Example 1, due to the fact that, because of the long time of mixing the main constituent particles and the accessory constituent particles, the average particle size of the ferrite particles was reduced, whereas the accessory constituent particles were made finer, and thus aggregated, thereby increasing the relative particle sizes of the segregated particles.

This is presumed to be, in Comparative Example 2, due to the fact that, because of the accessory constituent particles containing no $Bi_2O_3$ or $SiO_2$, the average particle size of the segregated particles was not increased.

What is claimed is:

1. A sintered magnetic material comprising:
   ferrite particles; and
   segregated particles containing Bi and Si,
   wherein the sintered magnetic material contains, as a main constituent,
   46.0 mol % to 50.0 mol % $Fe_2O_3$,
   0.4 mol % to 8.0 mol % CuO,
   23.0 mol % to 32.0 mol % ZnO, and
   18.0 mol % to 22.0 mol % NiO, and
   a ratio of an average particle size of the segregated particles to an average particle size of the ferrite particles is from 0.04 to 0.19.

2. The sintered magnetic material according to claim 1, wherein the segregated particles are from 0.35 μm to 0.60 μm in average particle size.

3. The sintered magnetic material according to claim 2, wherein the segregated particles further contain Cu.

4. The sintered magnetic material according to claim 2, wherein
   a content of Bi in the sintered magnetic material is from 0.30% by weight to 4.00% by weight in terms of $Bi_2O_3$ with respect to the main constituent, and

TABLE 1

|  |  |  |  | Example | | | | | | Comparative Example | |
| --- | --- | --- | --- | --- | --- | --- | --- | --- | --- | --- | --- |
|  |  |  |  | 1 | 2 | 3 | 4 | 5 | 6 | 1 | 2 |
| Magnetic Material | Composition of Main Constituent | mol % | $Fe_2O_3$ | 48.8 | 49.0 | 49.0 | 49.0 | 49.0 | 47.5 | 48.8 | 49.0 |
|  |  |  | CuO | 0.4 | 6.0 | 6.0 | 6.0 | 6.0 | 6.0 | 0.4 | 6.0 |
|  |  |  | ZnO | 31.9 | 23.1 | 23.1 | 23.1 | 23.1 | 28.5 | 31.9 | 23.1 |
|  |  |  | NiO | 18.9 | 21.9 | 21.9 | 21.9 | 21.9 | 18.0 | 18.9 | 21.9 |
|  | Proportion to Main Constituent | wt % | $SiO_2$ | 1.00 | 0.50 | 0.25 | 0.75 | 0.25 | 0.25 | 1.00 | 0 |
|  |  |  | $Co_3O_4$ | 0.15 | 0.02 | 0.02 | 0.02 | 0.02 | 0.02 | 0.15 | 0.02 |
|  |  |  | $Bi_2O_3$ | 4.00 | 2.25 | 0.75 | 1.50 | 0.75 | 0.75 | 4.00 | 0 |
|  |  |  | $SnO_2$ | 0 | 0.58 | 0.58 | 0.58 | 0.58 | 0 | 0 | 0.58 |
| SSA of Granulated Particles [$m^2/g$] |  |  |  | 3.17 | 2.93 | 2.79 | 2.71 | 2.58 | 2.79 | 5.14 | 2.40 |
| Magnetic Material | Segregation Ratio |  |  | 3.1% | 2.5% | 0.4% | 1.9% | 0.7% | 1.9% | 3.3% | 0.0% |
|  | Average Particle Size $d_1$ of Ferrite Particles |  |  | 2.04 | 5.86 | 9.38 | 5.33 | 8.17 | 6.00 | 1.92 | 8.46 |
|  | Average Particle Size $d_2$ of Segregated Particles |  |  | 0.35 | 0.60 | 0.37 | 0.47 | 0.38 | 0.57 | 0.38 | 0.22 |
|  | $d_2/d_1$ |  |  | 0.17 | 0.10 | 0.04 | 0.09 | 0.05 | 0.10 | 0.20 | 0.03 |
| Winding Core | Electrical Resistance Value IR |  |  | 10.7 | 9.6 | 10.1 | 7.9 | 9.9 | 9.5 | 10.8 | 9.4 |
|  | Chipping Ratio |  |  | 0.0% | 0.0% | 0.0% | 0.0% | 0.0% | 0.0% | 0.4% | 1.8% | a content of Si in the sintered magnetic material is from 0.10% by weight to 1.00% by weight in terms of $SiO_2$ with respect to the main constituent.

5. The sintered magnetic material according to claim 2, wherein
a ratio by weight of Bi in the sintered magnetic material to Si in the sintered magnetic material is from 3.00 to 5.00 in terms of $Bi_2O_3$ and $SiO_2$, respectively.

6. The sintered magnetic material according to claim 2, wherein
the segregated particles further contain Sn, and
a content of Sn in the sintered magnetic material is greater than 0% by weight and 0.58% by weight or less in terms of $SnO_2$ with respect to the main constituent.

7. The sintered magnetic material according to claim 2, wherein
the segregated particles further contain Co, and
a content of Co in the sintered magnetic material is from 0.02% by weight to 0.15% by weight in terms of $Co_3O_4$ with respect to the main constituent.

8. The sintered magnetic material according to claim 1, wherein the segregated particles further contain Cu.

9. The sintered magnetic material according to claim 8, wherein
a content of Bi in the sintered magnetic material is from 0.30% by weight to 4.00% by weight in terms of $Bi_2O_3$ with respect to the main constituent, and
a content of Si in the sintered magnetic material is from 0.10% by weight to 1.00% by weight in terms of $SiO_2$ with respect to the main constituent.

10. The sintered magnetic material according to claim 8, wherein
a ratio by weight of Bi in the sintered magnetic material to Si in the sintered magnetic material is from 3.00 to 5.00 in terms of $Bi_2O_3$ and $SiO_2$, respectively.

11. The sintered magnetic material according to claim 8, wherein
the segregated particles further contain Sn, and
a content of Sn in the sintered magnetic material is greater than 0% by weight and 0.58% by weight or less in terms of $SnO_2$ with respect to the main constituent.

12. The sintered magnetic material according to claim 1, wherein
a content of Bi in the sintered magnetic material is from 0.30% by weight to 4.00% by weight in terms of $Bi_2O_3$ with respect to the main constituent, and
a content of Si in the sintered magnetic material is from 0.10% by weight to 1.00% by weight in terms of $SiO_2$ with respect to the main constituent.

13. The sintered magnetic material according to claim 12, wherein
a ratio by weight of Bi in the sintered magnetic material to Si in the sintered magnetic material is from 3.00 to 5.00 in terms of $Bi_2O_3$ and $SiO_2$, respectively.

14. The sintered magnetic material according to claim 1, wherein
a ratio by weight of Bi in the sintered magnetic material to Si in the sintered magnetic material is from 3.00 to 5.00 in terms of $Bi_2O_3$ and $SiO_2$, respectively.

15. The sintered magnetic material according to claim 1, wherein
the segregated particles further contain Sn, and
a content of Sn in the sintered magnetic material is greater than 0% by weight and 0.58% by weight or less in terms of $SnO_2$ with respect to the main constituent.

16. The sintered magnetic material according to claim 1, wherein
the segregated particles further contain Co, and
a content of Co in the sintered magnetic material is from 0.02% by weight to 0.15% by weight in terms of $Co_3O_4$ with respect to the main constituent.

17. An electronic component comprising the sintered magnetic material according to claim 1.

18. A winding core comprising the sintered magnetic material according to claim 1.

19. An electronic component comprising the sintered magnetic material according to claim 2.

20. A winding core comprising the sintered magnetic material according to claim 2.

* * * * *